Aug. 20, 1957  J. M. ACKALUSKY  2,803,550
GUARD DEVICE FOR FROZEN CONFECTION
Filed Sept. 30, 1955

INVENTOR
JAMES M. ACKALUSKY
BY Gustave Miller
ATTORNEY

United States Patent Office 2,803,550
Patented Aug. 20, 1957

2,803,550

GUARD DEVICE FOR FROZEN CONFECTION

James M. Ackalusky, Pottsville, Pa.

Application September 30, 1955, Serial No. 537,694

1 Claim. (Cl. 99—137)

This invention relates to guards for frozen confections, and it particularly relates to guards which prevent drippings from frozen ices, ice cream, or the like, from falling upon the person eating it.

Although there have been various wrappings, guards, shields, etc. heretofore used on ice cream sticks, and the like, to prevent dripping, these prior devices have never fully accomplished their purpose. On the contrary, even in the case of those devices which acted to prevent drippings at all, after a short interval, while the person was still in the midst of eating the confection, the wrapper or guard device would become limp and soggy and would then tear apart, spilling out whatever drippings it had accumulated. This was messier than if no guard at all had been used.

It is one object of the present invention to provide guards for frozen confections which will not become limp, soggy and torn during use.

Another object of the present invention is to provide guards for frozen confections which are simple in construction and easy to apply and use.

Other objects of the present invention are to provide an improved guard for frozen confections, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
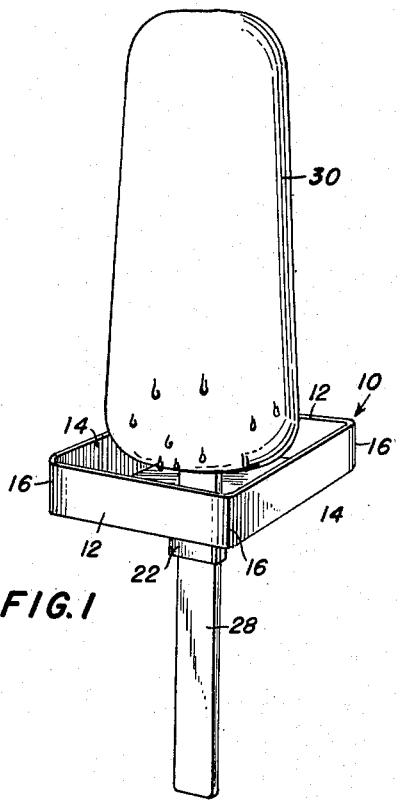
Fig. 1 is a perspective view of a guard, embodying the present invention, shown applied to a frozen ice stick.
Figure 2:
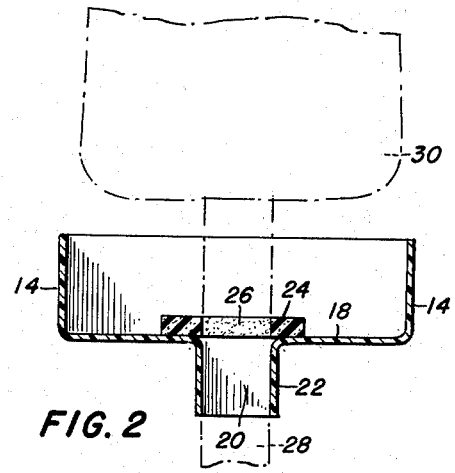
Fig. 2 is a cross-sectional view of the guard of Fig. 1, taken on line 2—2 of Fig. 3.
Figure 3:
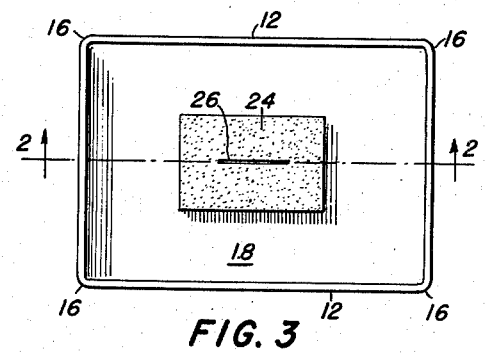
Fig. 3 is a top plan view of the guard of Fig. 1.
Figure 4:
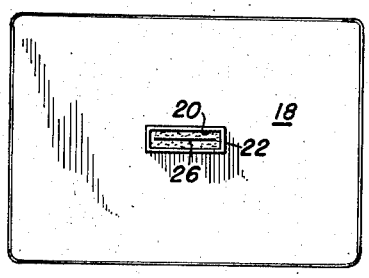
Fig. 4 is a bottom plan view of the guard of Fig. 1.

Referring now in greater detail to the drawing wherein similar reference characters refer to similar parts, there is shown a guard, generally indicated at 10, which comprises a generally rectangular container having two upstanding side walls 12 and two upstanding end walls 14. These walls are integrally connected at the four corners 16, and are also integral with a flat bottom wall 18. The side, end and bottom walls are all preferably made of vinyl resin, polyethylene or the like; in which case, it is of a semi-permanent nature and can be used over and over again. However, it can also be constructed of cardboard, heavy paper, molded wood pulp, etc.; in which case, it can be of the throw-away type which is used once and discarded.

In the center of the bottom wall 18 of the guard there is provided a rectangular opening 20, and depending from the opening is a sleeve 22 integral with the bottom wall.

Positioned upon the opening 20 above the sleeve, is a rectangular block of sponge rubber 24, the side and end walls of the sponge rubber block extending parallel to the corresponding walls of the container 10. A slit 26 is formed in the center of the sponge rubber block in coinciding relationship to the opening 20.

In use, the stick 28 of a frozen confection, such as shown at 30, is inserted downwardly through the slit 26 in the sponge rubber and through the opening 20 and sleeve 22 in the guard. When so inserted, the upstanding walls 12 and 14 of the guard will prevent the drippings from the frozen confection from running off the sides of the guard, while the resilient sealing action of the sponge rubber around the stick 28 will prevent running off of the drippings through the stick opening. The sponge rubber will also act to absorb much of the drippings so that, even if the guard is made of paper, it will not readily become limp and soggy.

It must, of course, be understood that although the guard 10 is here illustrated as being rectangular, it may be square, round, oval or any other desired shape and size which will best accommodate shape and size of the confection.

Although this invention has been described in considerable details, such description is intended as being illustrative rather than limiting, since the invention may be variously embodied, and the scope of the invention is to be determined as claimed.

Having thus set forth and disclosed the nature of this invention, what is claimed is:

In combination, a frozen confection mounted at one end of a handle stem, an open-top preshaped container guard of comparatively rigid material in underlying relationship to said confection, said container guard having a rigid flat bottom and upstanding preshaped rigid side walls thereabout, said bottom wall having an opening centrally therethrough and a resilient sponge rubber sealing block secured on said bottom wall about said opening, said sealing block having a slit therethrough aligned with said opening, said slit being maintained in normally closed position by the resiliency of said sponge rubber, whereby when said handle stem is slid through said slit in said block and said opening in said bottom wall to place said frozen confection in close relationship to said sponge rubber sealing block and said bottom wall, said sponge rubber sealing block snugly and resiliently embraces said handle stem to maintain said guard in said desired underlying relationship to said frozen confection and also serves to absorb and hold leakage from said frozen confection and prevent any leakage from dripping down said handle stem from said guard.

References Cited in the file of this patent

UNITED STATES PATENTS

| | | |
|---|---|---|
| 2,632,708 | Sueskind | Mar. 24, 1953 |
| 2,677,615 | Sueskind | May 4, 1954 |
| 2,735,778 | Taylor | Feb. 21, 1956 |